J. D. VAN ATTA.
RESILIENT VEHICLE WHEEL.
APPLICATION FILED FEB. 27, 1912.
1,030,946.
Patented July 2, 1912.
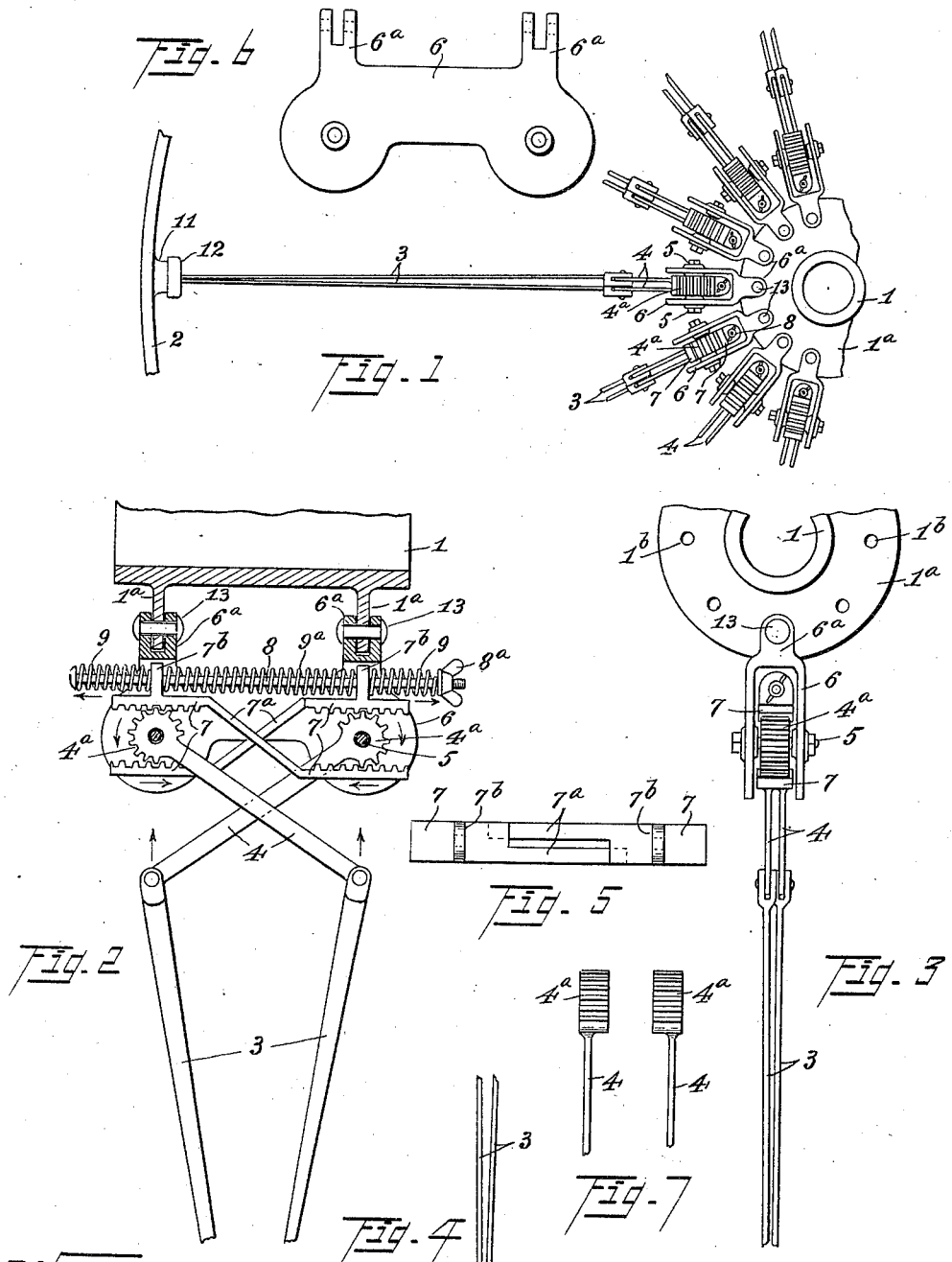

UNITED STATES PATENT OFFICE.

JEFF D. VAN ATTA, OF ASHFORK, ARIZONA.

RESILIENT VEHICLE-WHEEL.

1,030,946.

Specification of Letters Patent.

Patented July 2, 1912.

Application filed February 27, 1912. Serial No. 680,278.

*To all whom it may concern:*

Be it known that I, JEFF D. VAN ATTA, a citizen of the United States, residing at Ashfork, in the county of Yavapai and State of Arizona, have invented certain new and useful Improvements in Resilient Vehicle-Wheels, of which the following is a specification.

My invention relates to improvements in resilient vehicle wheels, the primary object of the invention being to provide a generally improved resilient or spring resisted vehicle wheel having its parts so arranged and adjusted whereby the same is adapted to provide the requisite elasticity and stability and eliminate the various objectionable features commonly found in vehicle wheels of this class.

A further object of the invention is to improve the construction of the movable spoke members and provide the proper form of connections between the wheel-hub and felly members whereby to brace the wheel as a whole as against lateral stresses at the hub and felly and at the same time provide for the requisite movements of the hub and felly members toward and from each other as in passing obstructions, taking up vertical shocks and vibrations, and the like.

A still further object of the invention is to provide improved spoke members adapted for use both as compression and suspension spokes and provided with improved spring and tension members whereby the sensitiveness of the wheel felly with respect to superposed loads and the impact due to passing obstructions may be readily regulated to meet the varying demands of actual service.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1, is a side elevation of a portion of a wheel constructed in accordance with my invention. Fig. 2, an enlarged longitudinal section of a portion of the wheel hub and one of the rack and pinion housings together with one set of toggle spokes connected thereto. Fig. 3, a side elevation of the same. Fig. 4, a side elevation of the lower ends of one set of toggle spokes the ball and socket bearing connected to the wheel felly being shown in section for the purpose of clearer illustration of the parts. Fig. 5, a top plan view of a set of rack members, detached. Fig. 6, a side elevation of one of the rack and pinion housings, detached. Fig. 7, an enlarged edge view of one set of pinion levers of toggle links, detached.

Similar numerals of reference designate like parts throughout all the figures of the drawings.

The improved resilient vehicle wheel comprises a hub member 1, provided, in the present instance, with a pair of circumferentially extending bearing rings $1^a$, the latter being provided at suitable intervals with bolt or rivet openings $1^b$.

As a means for resiliently connecting and supporting the hub and felly members 1 and 2, respectively, as well as providing means whereby said hub and felly members 1 and 2, may be moved toward and from each other as well as supporting the latter as against lateral stresses or displacement, a plurality of toggle spokes or link members 3, are provided, said toggle spokes or link members being transversely arranged in pairs and pivotally connected to transversely disposed pinion levers or toggle cross links 4, the latter being mounted on bearing pins or bolts 5, extending through the sides of the bearing or pinion housings 6, and provided with pinion heads $4^a$.

As a means for causing the toggle links 3 and 4, to operate in unison, the pinion heads $4^a$, of the toggle cross links 4, are connected at opposite sides with rack members 7, the intermediate portions $7^a$, of the latter crossing each other as shown most clearly in Figs. 2 and 5, of the drawings.

As a means for resiliently connecting the rack members 7, as well as regulating the sensitiveness of the toggle spokes or link members, the upper ends of the rack members 7, are provided with ears or lugs $7^b$, provided with openings adapted to receive and carry a guide bolt 8, surrounded by tension springs 9, and $9^a$, said springs 9, being adapted to be compressed when the toggle links and racks are operated upon as compression spokes as indicated by the arrows in Fig. 2, of the drawings, while the intermediate spring $9^a$ is compressed when the toggle spokes or link members 3 and 4 are acting as suspension spokes in the diametrically opposite portion of the wheel.

The outer ends of the toggle spokes 3, may be connected to the wheel felly 2, by means of bolt and socket joints, said joints or connections, in the present instance, comprising semi-cylindrical ball members 10, mounted in socket brackets 11, said ball members 10, being secured in the sockets 11, by means of removable retaining caps 12.

The bearing housings 6, carrying the rack and pinion mechanism are pivotally connected to the bearing rings 1ª, by means of bearing lugs or ears 6ª, extending on opposite sides of the bearing rings 1ª, of the hubs and secured to said rings by means of bolts or rivets 13.

The tension of the end springs 9, may be readily regulated through the medium of the thumb nut 8ª, on the end of the guide bolt 8, thus serving to regulate the sensitiveness of the toggle spokes or link members 3, and 4, and regulating the resiliency of the wheel as a whole as required by the demands of actual service.

From the foregoing description, taken in connection with the accompanying drawings, the operation and advantages of my invention will be readily understood.

Having thus described one of the embodiments of my invention, what I claim and desire to secure by Letters Patent is,—

1. A resilient wheel, comprising hub and felly members, spring resisted rack and pinion mechanism carried by said hub member, and toggle spokes connected to said rack and pinion mechanism and said felly member.

2. In a resilient wheel, hub and felly members, a plurality of toggle links transversely disposed between and connected to said members, rack and pinion mechanism connected to said toggle links, and spring mechanism connected to said rack and pinion mechanism.

3. A resilient wheel, comprising hub and felly members, a plurality of bearing housings pivotally connected to said hub member, rack and pinion mechanism mounted in said bearing housings, and toggle links connected to said felly member and said rack and pinion mechanism.

4. A resilient wheel, comprising a hub member, bearing housings pivotally connected therewith, rack and pinion mechanism mounted in said housings, and toggle spokes connected to said rack and pinion mechanism.

5. A resilient wheel, comprising a hub member provided with transversely disposed pinion levers, spring resisted rack members connected to the latter, and spoke members pivotally connected to said pinion levers and said hub member.

6. A resilient wheel, comprising a wheel-hub, a plurality of rack and pinion housings pivotally connected thereto, toggle spokes provided with pinions mounted in said housings, and spring resisted rack members connected to said pinions whereby said toggle spokes are operated in unison.

In testimony whereof I have affixed my signature in presence of two witnesses.

JEFF D. VAN ATTA.

Witnesses:
C. G. MARTZ,
CHESTER DICKERSON.

---

Copies of this patent may be obtained for five cents each, by addressing the "Commissioner of Patents, Washington, D. C."